United States Patent Office 3,197,479
Patented July 27, 1965

3,197,479
PROCESS FOR PRODUCING 3-SUBSTITUTED INDOLES
Herbert E. Johnson, South Charleston, W. Va., assignor to Union Carbide Corporation, a corporation of New York
No Drawing. Filed Sept. 10, 1962, Ser. No. 222,697
The portion of the term of the patent subsequent to July 31, 1979, has been disclaimed and dedicated to the Public
12 Claims. (Cl. 260—319)

This invention relates to a method for producing 3-substituted indoles. More particularly, this invention relates to a method for producing an indole substituted in the 3-position with a hydroxyhydrocarbyl radical or an alkoxyhydrocarbyl radical or an indol-3-ylhydrocarbyl radical.

The process of this invention essentially comprises reacting an indole having a hydrogen atom in the 1- and 3-positions with a diol or an alkoxyhydrocarbon alcohol having at least one primary or secondary hydroxyl group in contact with an inorganic base as a catalyst. Although the reaction of indole with a diol or an alkoxyhydrocarbon alcohol in contact with an anhydrous sodium alkoxide has been reported by Cornforth et al., J. Chem. Soc., 680 (1942), and Oddo et al., Chem. Abs. 27, 3933[6] (1933), the product which was recovered in all instances was a 3-alkylindole. Applicant has discovered that when an inorganic base is employed instead of the organic base of Cornforth et al. and Oddo et al., the main product of the reaction is a 3-(hydroxyhydrocarbyl)indole or a 3-(alkoxyhydrocarbyl)indole. Applicant has further discovered that when a diol is employed, it is also possible to produce a bis(3-indolyl)hydrocarbon compound.

The 3-(hydroxyhydrocarbyl)indole, 3-(alkoxyhydrocarbyl)indoles, and bis(3-indolyl)hydrocarbon compounds which are produced by the process of this invention are represented by the formula:

(I)         Z—R—Z$^1$ wherein R is a divalent hydrocarbon radical free from aliphatic, i.e., olefinic or acetylenic, unsaturation having at least 2, preferably from 2 to 10, carbon atoms and having at least one of its valence bonds from a carbon atom having a hydrogen atom bonded thereto; Z is a 3-indolyl nucleus bonded to said —R— group through a carbon atom having a hydrogen atom bonded thereto; Z$^1$ is Z or —O(C$_n$H$_{2n}$)H; and $n$ is an integer having a value of at least 0, preferably from 0 to 10. The —R— group can be composed of alkylene groups, such as ethylene, propylene, trimethylene, hexamethylene, 2-ethylhexamethylene, decamethylene and the like; cycloalkylene groups, such as 1,4-cyclohexylene, 2,5-bicyclo[2.2.1]heptylene and the like; and arylene groups, when bonded to the indole nucleus through an alkylene radical, such as p-benzylene; etc.

Subgeneric to the compounds of Formula I are the 3-(hydroxyhydrocarbyl)- and 3-(alkoxyhydrocarbyl)indoles of the formula:

(II) —RO(C$_n$H$_{2n}$)H wherein R and $n$ are as defined above and the indolyl nucleus is bonded to the R group through a carbon atom having a hydrogen atom bonded thereto. These compounds can be further represented by the following formulae:

(III) 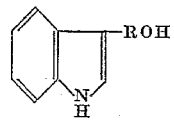—ROH (IV) 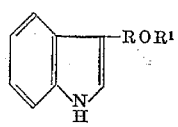—ROR$^1$ wherein R is as defined above and R$^1$ is an alkyl group having at least 1, and preferably from 1 to 10, carbon atoms. As examples of the alcohols of Formula III one can mention 3-(2-hydroxyethyl)indole, 3-(2-hydroxypropyl)indole, 3-(3-hydroxypropyl)indole, 3-(4-hydroxybutyl)indole, 3-(5-hydroxypentyl)indole, 3-(2-ethyl-6-hydroxyhexyl)indole, 3-(10-hydroxydecyl)indole, 3-(4-hydroxycyclohexyl)indole, 3-(5-hydroxybicyclo[2.2.1]hept-2-yl)indole, 3-[4-(hydroxymethyl)cyclohexylmethyl]indole, 3-(4-hydroxybenzyl)indole, 3-(4-hydroxymethylbenzyl)indole, and the like. Examples of the ethers of Formula IV include 3-(2-methoxyethyl)indole, 3-(10-methoxydecyl)indole, 3-(2-ethoxyethyl)indole, 3-(2-propoxyethyl)indole, 3-(2-isopropoxyethyl)indole, 3-(2-hexoxyethyl)indole, 3-(2-decoxyethyl)indole and the like. Both the 3-(hydroxyhydrocarbyl)indoles and their alkyl ethers are biologically active compounds, finding utility as bactericides, fungicides, nematocides, and the like. However, little active investigation of their properties has been carried out due to the complexity and inefficiency of the processes for their production prior to this invention. For example, 3-(2-hydroxyethyl)indole was produced via a Grignard synthesis, whereby 3-indolyl magnesium bromide was produced and reacted with 2-chloroethanol to produce the alcohol. By this invention, however, applicant has provided a simple, one step process for the 3-(hydroxyhydrocarbyl)indoles and their ethers. Moreover, the process of this invention is not limited to one or only a few of the alcohols and their ethers, as were the previously known processes, but is suitable for the production of a wide group of alcohols and ethers.

The bis(3-indolyl)hydrocarbon compounds produced by the process of this invention are represented by the formula:

(V) 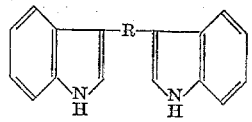

wherein R is as previously defined and the 3-indolyl nuclei are bonded to the R-group through a carbon atom having a hydrogen atom bonded thereto. As examples of these compounds one can mention, 1,2-bis(3-indolyl)ethane, 1,2-bis(3-indolyl)propane, 1,3-bis(3-indolyl)propane, 1,4-bis(3-indolyl)butane, 1,6-bis(3-indolyl)hexane, 1,10-bis(3-indolyl)decane, 1,4-bis(3-indolyl)-cyclohexane, 1,4-bis(3-indolylmethyl)cyclohexane, 1,4-bis(3-indolylmethyl)benzene, and the like. These bis(3-indolyl)-hydrocarbon compounds, like the alcohols and ethers referred to above, were previously produced by complex processes which generally were suitable for only one or a limited group of compounds of this class. The process of this invention, however, readily produces a wide variety of the bis(3-indolyl)-hydrocarbon compounds.

As indicated above, the indole which is employed in the process of this invention must have a hydrogen atom on the 1- and 3-positions. The remaining positions can be substituted with any radical which is inert under the reaction conditions employed, such as alkyl, aralkyl, aryl, alkaryl, alkoxy and the like. Suitable indole compounds are represented by the formula:

(VI)

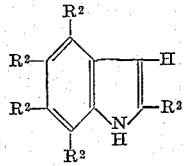

wherein each $R^2$, when taken individually, is a hydrogen atom, an alkyl radical of from 1 to 10 carbon atoms, such as methyl, ethyl, propyl, isopropyl, hexyl, 2-ethylhexyl, decyl and the like; an aryl radical of from 6 to 10 carbon atoms such as phenyl and naphthyl; an aralkyl radical of from 7 to 10 carbon atoms such as benzyl and phenethyl; and alkaryl radical of from 7 to 10 carbon atoms such as tolyl, xylyl and mesityl; an alkoxy radical of from 1 to 10 carbon atoms such as methoxy, ethoxy, decoxy and the like; etc. Suitable indole compounds include indole, 2-methylindole, 4-methylindole, 5-methylindole, 6-methylindole, 7-methylindole, 2-ethylindole, 2-(2-ethylhexyl)-indole, 2-phenylindole, 2-benzylindole, 2-ethoxyindole and the like.

The alcohols which are employed in the process of this invention are represented by the formula:

(VII)  $XRO(C_nH_{2n})H$ wherein R is a divalent hydrocarbon radical free from aliphatic, i.e. olefinic and acetylenic, unsaturation having at least 2, preferably from 2 to 10, carbon atoms, at least one of whose valence bonds is through a carbon atom having a hydrogen atom bonded thereto; X is a hydroxyl group bonded to said R group through a carbon atom having a hydrogen atom bonded thereto; and n is an integer having a value of at least 0, and preferably from 0 to 10. Subgeneric to the compounds of Formula VII are the diols free from aliphatic unsaturation having at least one hydroxyl group bonded to a carbon atom having a hydrogen atom bonded thereto and having at least 2, preferably from 2 to 10, carbon atoms, and the alkoxyhydrocarbon alcohols of the formula:

(VIII)  $HOROR^1$ wherein R and $R^1$ are as defined above and the hydroxyl group is bonded to a carbon atom having a hydrogen atom bonded thereto. It should be noted that the alcohol employed should have at least one hydroxyl group bonded to a carbon atom having a hydrogen atom bonded thereto; that is, the alcohol should have at least one primary or secondary hydroxyl group. Diols having only tertiary or phenolic hydroxyl groups will not react with the indole. When both hydroxyl groups are primary or secondary, the bis(3-indolyl)hydrocarbon compounds of Formula V above are produced. As examples of suitable diols one can mention ethylene glycol, propylene glycol, trimethylene diol, tetramethylene diol, hexamethylene diol, decamethylene diol, 1,4-dihydroxycyclohexane, 2,5-dihydroxybicyclo[2.2.1]-heptane, 1,4-bis(hydroxymethyl)cyclohexane, 4-hydroxybenzyl alcohol, 4-(hydroxymethylbenzyl)-alcohol and the like. Illustrative examples of the alkoxyhydrocarbon alcohols of the Formula VIII above include 2-methoxyethanol, 2-decoxyethanol, 3-methoxypropanol, 2-ethoxypropanol, 2-isopropoxypropanol, and the like.

In general, the mole ratio of diol or alkoxyhydrocarbon alcohols to indole in the reaction mixture can vary from 0.1:1 or less to 10:1 or more. Higher and lower ratios can be employed but offer no particular advantages. However, when a diol having only primary or secondary hydroxyl groups is employed, the mole ratio employed will depend upon the product desired. Mole ratios of diol to indole in excess of 1:1 and preferably at least 2:1 should be employed if a 3-(hydroxyhydrocarbyl)indole is desired as the main product. Conversely, mole ratios of diol to indole of less than 1:1, and preferably less than 0.5:1 should be employed if a bis(3-indolyl)hydrocarbon compound is desired as the final product.

As indicated above, the process of this invention is conducted in the presence of an inorganic base as a catalyst. The bases which have been found suitable as catalysts are the alkali metal hydroxides, i.e., lithium hydroxide, sodium hydroxide, potassium hydroxide, rubidium hydroxide and cesium hydroxide, and barium hydroxide. The bases which are preferred are sodium hydroxide, potassium hydroxide, and barium hydroxide. In general, the amount of inorganic base sufficient to catalyze the reaction of alcohol with indole can vary from about 0.01 to about 1 or more moles of base per mole of indole charged, with from about 0.1 to about 0.5 mole of base per mole of indole preferred.

The process of this invention is preferably conducted in aqueous medium, employing from about 1 to about 100, preferably from about 2 to about 50, moles of water per mole of indole charged, particularly when a 3-(hydroxyhydrocarbyl)indole is the desired final product.

In addition, it has been found desirable, especially when a 3-(hydroxycarbyl)indole is the desired product, to conduct the reaction under a hydrogen atmosphere. The hydrogen pressure can vary from atmospheric pressure to 500 p.s.i.g. or more, with pressures of from 50 p.s.i.g. to 20 p.s.i.g. preferred.

The reaction is conducted at elevated temperatures. Temperatures of from about 175° C. or lower to about 350° C. or higher have been found suitable, with temperatures of from 245° C. to 265° C. being preferred. The reaction time is not particularly critical and can vary from 0.5 to 48 hours, shorter times reducing the yield of product and longer times causing decomposition of the product. The product 3-(hydroxyhydrocarbyl)-indole, 3-(alkoxyhydrocarbyl)indole or bis(3-indolyl)hydrocarbon compound is recovered from the reaction mixtures according to methods known to those skilled in the art.

The following examples are illustrative.

EXAMPLE 1

*3-(2-hydroxyethyl)indole*

A 3-liter, stainless steel, rocker autoclave was charged with 117 grams of indole, 1000 ml. of ethylene glycol, and 7.0 grams of potassium hydroxide. The autoclave was sealed and heated at 250° C. for 19 hours while agitating the reaction mixture by rocking. The autoclave was then cooled, opened, and the contents were filtered to remove solids. The filtrate was evaporated under vacuum to a volume of about 400 ml. and then admixed with 1 liter of water. The aqueous mixture was extracted with ether. On vacuum distillation of the ether extract there were recovered 21 grams of 3-(2-hydroxyethyl)indole as a fraction boiling at 150–186° C. at 1.0 mm. Hg. A sample of the 3-(2-hydroxyethyl)indole, after recrystallization from toluene melted at 56–57° C. [The melting point of 3-(2-hydroxyethyl)indole was reported by Oddo and Camberi, Gazz. Chem. Ital., 69, 19 (1939), to be 57–58° C.]

*Analysis.*—Calculated for $C_{10}H_{11}NO$: C, 74.51%; H, 6.88%; N, 8.69%. Found: C, 74.21%; H, 6.85%; N, 8.60%.

EXAMPLE 2

*3-(2-hydroxyethyl)indole*

Employing apparatus and procedures similar to those described in Example 1, an autoclave was charged with 234 grams of indole, 1146 grams of ethylene glycol, 126.2 grams of hydrated barium hydroxide (Ba(OH)$_2$.8H$_2$O) and 128 milliliters of water. The autoclave was flushed with hydrogen, sealed and heated at 250° C. for 19.5 hours. There were produced 225 grams of 3-(2-hydroxyethyl)indole which were recovered as a fraction boiling at 160 to 174° C. at 1.0 mm. Hg.

EXAMPLE 3

3-(2-hydroxyethyl)indole

Employing similar apparatus, procedure, reactants and amounts as described in Example 2, except that the reaction was conducted under 100 p.s.i.g. of hydrogen, 243 grams of 3-(2-hydroxyethyl)indole were produced which were recovered as a fraction boiling at 192 to 213° C. at 2.5 mm. Hg.

EXAMPLE 4

3-(2-hydroxyethyl)indole

Employing apparatus and procedures similar to those described in Example 1, 50 grams of indole, 1 liter of ethylene glycol, and 40 grams of sodium hydroxide were reacted at 210° C. for 12 hours to produce 14 grams of 3-(2-hydroxyethyl)indole boiling at 155 to 174° C. at 0.6 mm. Hg.

EXAMPLE 5

3-(2-hydroxypropyl)indole

Employing apparatus and procedures similar to those described in Example 1, 234 grams of indole, 1000 ml. of propylene glycol, and 126 grams of hydrated barium hydroxide (Ba(OH).8H$_2$O) were reacted at 250° C. for 19 hours to produce 94.5 grams of 3-(2-hydroxypropyl)-indole boiling at 162–164° C. at 0.75 mm. Hg and having an index of refraction, $n_D^{30}$, of 1.5970.

*Analysis.*—Calculated for C$_{11}$H$_{13}$NO: C, 75.40%; H, 7.40%; N, 7.99%. Found: C, 74.94%; H, 7.37%; N, 7.95%.

EXAMPLE 6

3-(1-methyl-2-hydroxypropyl)indole

Employing apparatus and procedures similar to those described in Example 1, 117 grams of indole, 1000 ml. of 2,3-butane diol, and 5.9 grams of potassium hydroxide were reacted at 250° C. for 19 hours to produce 95 grams of 3-(1-methyl-2-hydroxypropyl)indole, which had a boiling range of 152–164° C. at 0.5 mm. Hg and a refractive index, $n_D^{30}$, of 1.5855.

*Analysis.*—Calculated for C$_{12}$H$_{15}$NO: C, 76.15%; H, 7.99%; N, 7.40%. Found: C, 75.98%; H, 7.82%; N, 7.18%.

EXAMPLE 7

3-(4-hydroxybutyl)indole

Employing apparatus and procedures similar to those described in Example 1, 117 grams of indole, 1000 ml. of tetramethylene diol, and 8.4 grams of potassium hydroxide were heated at 250° C. for 19.5 hours. There were recovered 64 grams of 3-(4-hydroxybutyl)indole having a boiling range of 189–202° C. at 2.0 mm. Hg.

*Analysis.*—Calculated for C$_{12}$H$_{15}$NO: C, 76.15%; H, 7.99%; N, 7.40%. Found: C, 76.04%; H, 7.88%; N, 7.44%.

EXAMPLE 8

3-(6-hydroxyhexyl)indole

Employing apparatus and procedures similar to those described in Example 1, 117 grams of indole, 200 grams of hexamethylene diol, and 8.4 grams of potassium hydroxide were heated at 250–300° C. for 19 hours. There were recovered 56.5 grams of 3-(6-hydroxyhexyl) indole having a boiling point of 211° C. at 1.5 mm. Hg and having an index of refraction, $n_D^{30}$, of 1.5682.

*Analysis.*—Calculated for C$_{14}$H$_{19}$NO: C, 77.38%; H, 8.81%; N, 6.45%. Found: C, 77.13%; H, 8.74%; N, 6.22%.

EXAMPLE 9

3-(5-hydroxypentyl)indole

Employing apparatus and procedures similar to those described in Example 1, 117 grams of indole, 1000 ml. of pentamethylene diol and 8.4 grams of potassium hydroxide were heated at 250° C. for 19.5 hours. There were recovered 71 grams of 3-(5-hydroxypentyl)indole having a boiling point of 205° C. at 1.5 mm. Hg and having a refractive index, $n_D^{30}$, of 1.5802.

*Analysis.*—Calculated for C$_{13}$H$_{17}$NO: C, 76.81%; H, 8.43%; N, 6.89%. Found: C, 76.52%; H, 8.27%; N, 6.85%.

EXAMPLE 10

3-(1,4-dimethyl-4-hydroxylbutyl)indole

Employing apparatus and procedures similar to those described in Example 1, 117 grams of indole, 273 grams of 2,5-hexane diol, and 8.4 grams of potassium hydroxide were heated at 250° C. for 19 hours. There were recovered 94 grams of 3-(1,4-dimethyl-4-hydroxylbutyl) indole, having a boiling point of 174° C. at 2.0 mm. Hg. and an index of refraction, $n_D^{30}$, of 1.5708.

*Analysis.*—Calculated for C$_{14}$H$_{19}$NO: C, 77.38%; H, 8.81%; N, 6.45%. Found: C, 77.25%; H, 8.25%; N, 6.36%.

EXAMPLE 11

3-(2-ethoxyethyl)indole

Employing apparatus and procedures similar to those described in Example 1, 117 grams of indole, one liter of 2-ethoxyethanol, and 10 grams of potassium hydroxide were heated at 250° C. for 19 hours to produce 56 grams of 3-(2-ethoxyethyl)indole which boiled at 147° C. at 1.25 mm. Hg, and had an index of refraction, $n_D^{30}$, of 1.5684.

EXAMPLE 12

3-(2-butoxyethyl)indole

Employing apparatus and procedures similar to those described in Example 1, 117 grams of indole, one liter of 2-butoxyethanol, and 10 grams of potassium hydroxide were heated at 250° C. for 19.5 hours to produce 79 grams of 3-(2-butoxyethyl)indole having a boiling point of 187° C. at 1.5 mm. Hg and a melting point of 26–27° C.

EXAMPLE 13

3-(1-methyl-2-ethoxyethyl)indole

Employing apparatus and procedures similar to those described in Example 1, 117 grams of indole, 600 grams of 1-methyl-2-ethoxyethanol, and 10 grams of potassium hydroxide were heated at 250° C. for 19.5 hours to produce 26 grams of 3-(1-methyl-2-ethoxyethyl)indole having a boiling point of 158° C. at 1.0 mm. Hg and an index of refraction, $n_D^{30}$, of 1.5604.

EXAMPLE 14

3-(1-methyl-2-isopropoxyethyl)indole

Employing apparatus and procedures similar to those described in Example 1, 117 grams of indole, 378 grams of 1-methyl-2-isopropoxyethanol, and 10 grams of potassium hydroxide were heated at 250° C. for 19.5 hours to produce 35 grams of 3-(1-methyl-2-isopropoxyethyl) indole having a boiling point of 157° C. at 1.25 mm. Hg and an index of refraction, $n_D^{30}$, of 1.5518.

EXAMPLE 15

3-(1-methyl-2-butoxyethyl)indole

Employing apparatus and procedures similar to those described in Example 1, 117 grams of indole, 635 grams of 1-methyl-2-butoxyethanol, and 10 grams of potassium hydroxide were heated at 250° C. for 19.5 hours to produce 76 grams of 3-(1-methyl-2-butoxyethyl)indole having a boiling point of 170° C. at 1.25 mm. Hg and an index of refraction, $n_D^{30}$, of 1.5454.

EXAMPLE 16

*3-[4-(hydroxymethyl)cyclohexylmethyl]indole*

Employing apparatus and procedures similar to those described in Example 1, 117 grams of indole, 492 grams of 1,4-bis(hydroxymethyl)cyclohexane and 10 grams of potassium hydroxide were heated at 250° C. for 16 hours to produce 128 grams of 3-[4-(hydroxymethyl)cyclohexylmethyl]indole which were recovered as a fraction boiling at 214 to 222° C. at 0.7 mm. Hg.

*Analysis.*—Calculated for $C_{16}H_{21}NO$: C, 78.79%; H, 8.70%; N, 5.76%. Found: C, 78.76%; H, 8.60%; N, 5.76%.

EXAMPLE 17

*1,4-bis(3-indolylmethyl)cyclohexane*

The solid residue remaining in the pot from the distillation of the reaction mixture of Example 16 weighed 38 grams and was found to be 1,4-bis(3-indolylmethyl) cyclohexane. After several recrystallizations from xylene, the 1,4-bis(3-indolylmethyl)cyclohexane had a melting point of 218–220° C.

*Analysis.*—Calculated for $C_{24}H_{26}N_2$: C, 84.17%; H, 7.65%; N, 8.18%. Found: C, 84.20%; H, 7.72%; N, 8.17%.

EXAMPLE 18

*1,4-di(3-indolyl)butane*

Employing apparatus and procedures similar to those described in Example 1, 84 grams of tetramethylene diol, 220 grams of indole, and 10 grams of potassium hydroxide were heated at 250° C. for 16 hours. 1,4-di(3-indolyl)butane was recovered as a viscous liquid boiling at 254° C. at 0.5 mm. Hg.

*Analysis.*—Calculated for $C_{20}H_{20}N_2$: C, 83.29%; H, 6.99%; N, 9.71%. Found: C, 82.98%; H, 6.61%; N, 9.93%.

What is claimed is:

1. The process for producing a compound selected from the group consisting of 3-(hydroxyhydrocarbyl)indole, 3-(alkoxyhydrocarbyl)indole, bis(3-indolyl)hydrocarbon, and mixtures thereof which comprises heating at 175° C. to 350° C. a mixture of (a) an indole having a hydrogen atom on the 1- and 3-positions thereof with (b) an alcohol of the formula $$XRO(C_nH_{2n})H$$

wherein R is a divalent hydrocarbon radical free from aliphatic unsaturation having from 2 to 10 carbon atoms, and having at least one valence bond from a carbon atom having a hydrogen atom bonded thereto; X is a hydroxyl group bonded to said R-group through a carbon atom having a hydrogen atom bonded thereto; and $n$ is an integer having a value of from 0 to 10, in contact with (c) an inorganic base selected from the group consisting of an alkali metal hydroxide and barium hydroxide.

2. The process for producing a 3-(hydroxyhydrocarbyl)indole, a bis(3-indolyl)hydrocarbon compound, and mixtures thereof which comprises heating at 175° C. to 350° C. a mixture of (a) an indole having a hydrogen atom on the 1- and 3-positions thereof, with a (b) diol free from aliphatic unsaturation having at least one hydroxyl group bonded to a carbon atom having a hydrogen atom bonded thereto, said diol having from 2 to 10 carbon atoms, in contact with (c) a catalytic amount of an inorganic base selected from the group consisting of sodium hydroxide, potassium hydroxide and barium hydroxide.

3. The process for producing a 3-(hydroxyhydrocarbyl)indole which comprises heating at 175° C. to 350° C. a mixture of (a) an indole having a hydrogen atom on the 1- and 3-positions thereof with (b) a molar excess, based on said indole, of a diol free from aliphatic unsaturation having at least one hydroxyl group bonded to a carbon atom having a hydrogen atom bonded thereto, said diol containing from 2 to 10 carbon atoms, in contact with (c) a catalytic amount of an inorganic base selected from the group consisting of sodium hydroxide, potassium hydroxide and barium hydroxide.

4. The process for producing 3-(2-hydroxyethyl)indole which comprises heating at 175° C. to 350° C. a mixture of indole with a molar excess based on indole of ethylene glycol in contact with a catalytic amount of an inorganic base selected from the group consisting of sodium hydroxide, potassium hydroxide, and barium hydroxide.

5. The process for producing 3-(2-hydroxypropyl)indole which comprises heating at 175° C. to 350° C. a mixture of indole with a molar excess based on indole of propylene glycol in contact with a catalytic amount of an inorganic base selected from the group consisting of sodium hydroxide, potassium hydroxide and barium hydroxide.

6. The process for producing 3-(1-methyl-2-hydroxypropyl)indole which comprises heating at 175° C. to 350° C. a mixture of indole with a molar excess based on indole of 2,3-butane diol in contact with a catalytic amount of an inorganic base selected from the group consisting of sodium hydroxide, potassium hydroxide and barium hydroxide.

7. The process for producing 3-(4-hydroxybutyl)indole which comprises heating at 175° C. to 350° C. a mixture of indole with a molar excess based on indole of tetramethylene diol in contact with a catalytic amount of an inorganic base selected from the group consisting of sodium hydroxide, potassium hydroxide, and barium hydroxide.

8. The process for producing 3-(5-hydroxypentyl)indole which comprises heating at 175° C. to 350° C. a mixture of indole with a molar excess based on indole of pentamethylene diol in contact with a catalytic amount of an inorganic base selected from the group consisting of sodium hydroxide, potassium hydroxide and barium hydroxide.

9. The process for producing 3-(1,4-dimethyl-4-hydroxybutyl)indole which comprises heating at 175° C. to 350° C. a mixture of indole with molar excess based on indole of 2,5-hexane diol in contact with a catalytic amount of an inorganic base selected from the group consisting of sodium hydroxide, potassium hydroxide and barium hydroxide.

10. The process for producing 3-[4-(hydroxymethyl)cyclohexylmethyl]indole which comprises heating at 175° C. to 350° C. a mixture of indole with a molar excess based on indole of 1,4-bis(hydroxymethyl)cyclohexane in contact with a catalytic amount of an inorganic base selected from the group consisting of sodium hydroxide, potassium hydroxide, and barium hydroxide.

11. The process for producing a 3-(alkoxyhydrocarbyl)indole which comprises heating at 175° C. to 350° C. a mixture of (a) an indole having a hydrogen atom on the 1- and 3-positions thereof with (b) an alkoxyhydrocarbinol of the formula $$XROR^1$$

wherein X is a hydroxyl group bonded to a carbon atom having at least one hydrogen atom bonded thereto; R is a divalent hydrocarbon radical free from aliphatic unsaturation having from 2 to 10 carbon atoms; and $R^1$ is an alkyl radical of from 1 to 10 carbon atoms in contact with (c) a catalytic amount of an inorganic base selected from the group consisting of sodium hydroxide, potassium hydroxide and barium hydroxide.

12. The process for producing a bis(3-indolyl)hydrocarbon compound which comprises heating at 175° C. to 350° C. a mixture of (a) an indole having a hydrogen atom on the 1- and 3-positions thereof with (b) a diol free from aliphatic unsaturation wherein each hydroxyl group is bonded to a carbon atom having at least one hydrogen atom bonded thereto, said diol having from 2 to 10 carbon atoms; the mole ratio of diol to indole being less than 1:1, in contact with (c) an inorganic base selected from the group consisting of sodium hydroxide, potassium hydroxide, and barium hydroxide.

References Cited by the Examiner
UNITED STATES PATENTS

| | | | |
|---|---|---|---|
| 3,029,236 | 4/62 | Staeuble | 260—249.5 |
| 3,047,585 | 7/62 | Johnson | 260—319 |
| 3,117,139 | 1/64 | Mooradian | 260—294.3 |

NICHOLAS S. RIZZO, *Primary Examiner.*